United States Patent
Poschmann et al.

(10) Patent No.: US 6,409,976 B1
(45) Date of Patent: Jun. 25, 2002

(54) REACTOR WITH POROUS HOLLOW FIBERS FOR CHEMICAL REACTIONS

(75) Inventors: Thomas Poschmann, Ulm; Steffen Wieland, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/244,121

(22) Filed: Feb. 4, 1999

(30) Foreign Application Priority Data

Feb. 4, 1998 (DE) .......................... 198 04 286

(51) Int. Cl.$^7$ .............................. F28D 21/00; B01J 8/02
(52) U.S. Cl. ..................... 422/199; 422/196; 422/198; 422/312
(58) Field of Search .................. 48/198.6–198.7, 48/198.8, DIG. 5; 422/199, 196, 206, 197, 312, 236, 238, 239, 218, 220, 221, 240, 174; 95/45, 56, 55; 96/10; 392/488

(56) References Cited

U.S. PATENT DOCUMENTS

| | | | | |
|---|---|---|---|---|
| 2,616,165 A | * | 11/1952 | Brennan ..................... 429/221 |
| 3,375,288 A | * | 3/1968 | Rosset ......................... 422/197 |
| 3,507,627 A | * | 4/1970 | Frant et al. ................. 422/197 |
| 3,616,334 A | * | 10/1971 | Aker et al. ................. 204/265 |
| 3,638,396 A | * | 2/1972 | Lovelock .................... 95/56 |
| 3,688,083 A | * | 8/1972 | Rice et al. ................... 392/488 |
| 3,828,161 A | * | 8/1974 | Yamaguchi ................. 392/485 |
| 4,091,086 A | * | 5/1978 | Hindin et al. ............. 423/648.1 |
| 4,175,153 A | | 11/1979 | Dobo et al. ................. 428/398 |
| 4,329,157 A | | 5/1982 | Dobo et al. ..................... 95/56 |
| 4,810,485 A | * | 3/1989 | Marianowski et al. ... 423/648.1 |
| 4,981,676 A | | 1/1991 | Minet et al. ................. 423/652 |
| 5,306,411 A | * | 4/1994 | Mazanec et al. ............ 204/265 |
| 5,474,680 A | | 12/1995 | Eguchi .................. 210/500.23 |
| 5,558,936 A | | 9/1996 | Chung et al. ................ 428/378 |
| 5,584,983 A | * | 12/1996 | Pruyn .......................... 205/103 |
| 5,989,319 A | * | 11/1999 | Kawae et al. .................. 96/11 |

FOREIGN PATENT DOCUMENTS

| | | |
|---|---|---|
| AT | 247284 | 8/1963 |
| EP | 0 186 129 A2 | 7/1986 |
| EP | 0 228 885 B1 | 7/1987 |
| FR | 1 417 757 | 2/1966 |
| JP | 55 119420 | 9/1980 |
| JP | 62 162601 | 7/1987 |

* cited by examiner

Primary Examiner—Jerry D. Johnson
Assistant Examiner—Alexa A. Doroshenk
(74) Attorney, Agent, or Firm—Crowell & Moring LLP

(57) ABSTRACT

A reactor for the catalytic chemical reaction of a gaseous or liquid reaction starting product to a reaction end product that contains a gaseous or liquid reaction constituent which can be selectively separated by means of a membrane diffusion includes a reaction space into which the reaction starting product flows and which contains a suitable catalyst material. Porous hollow fibers are placed in the reaction space as membranes for the selective separation of the reaction constituent from the residual reaction end product.

9 Claims, 1 Drawing Sheet

REACTOR WITH POROUS HOLLOW FIBERS FOR CHEMICAL REACTIONS

BACKGROUND AND SUMMARY OF THE INVENTION

This application claims the priority of German Patent Application No. 198 04 286.8, filed Feb. 4, 1998.

The present invention relates to a reactor for the catalytic chemical reaction of a gaseous or liquid starting product to an end product that contains a gaseous or liquid constituent which can be selectively separated by means of membrane diffusion.

Reactors which are suitable for the catalytic chemical reaction of a gaseous or liquid reaction starting product to a reaction end product, wherein the reaction end product contains a gaseous or liquid reaction constituent that can be selectively separated by means of membrane diffusion, are in use, for example, for the water vapor reforming of methanol. Such reactors have a reaction space into which the reaction starting product can flow and which contains a suitable catalyst material. In the water vapor reforming of methanol, a hydrogen-rich mixture containing a certain part of carbon monoxide is obtained as the reaction end product. It is known to use such methanol reforming reactors in mobile systems in fuel-cell-operated motor vehicles in order to obtain the hydrogen required for the fuel cells from liquid methanol. Since carbon monoxide has a damaging influence on the fuel cells, the reaction end product of the methanol reforming reaction requires a corresponding treatment. The selective separation of the hydrogen by means of a membrane diffusion is known as one possibility. Particularly for a mobile use in automotive engineering, it is desirable for reasons of dynamics and space that the reactor have a construction which is as compact and as light as possible and has few components. In this case, as few control units and automatic control units as possible should be used, while a high efficiency is simultaneously endeavored.

U.S. Pat. No. 4,981,676 discloses a reactor which is used for the water vapor reforming of a hydrocarbon, particularly methane, and contains a cylindrical-ring-shaped reaction space that is filled with a suitable catalyst pellet charge. To the outside, the reaction space is bounded by a metallic wall which can be heated from the outside, while the inner boundary of the reaction space is formed by a tube that acts as a hydrogen separating membrane and has a correspondingly porous ceramic tube wall. The diameter of the membrane tube is typically of the order of 25 mm and greater.

European Patent Document EP 0 228 885 B1 discloses a reactor for the decomposition of hydrogen sulfide for the purpose of obtaining hydrogen, which is constructed as a so-called tube bundle reactor. The reactor contains a bundle of spaced reaction tubes which form the reaction space. The reaction tubes are implemented by means of a porous wall such that they act as a selectively hydrogen-separating membrane as well as contain a suitable catalyst material. The wall thickness of the tube is approximately 1 mm and the tube diameter is a multiple thereof.

As a special membrane for the selective separation of certain constituents from a substance mixture by means of membrane diffusion, so-called hollow fibers are known, as described, for example, in European Published Patent Application EP 0 186 129 A2 and U.S. Pat. Nos. 4,175,153, 5,474,680, and 5,558,936. These hollow fibers have a porous wall made, for example, of ceramic or glass material, through which one selected constituent of a substance mixture can move. Such hollow fibers are suggested, for example, for the selective separation of hydrogen from a hydrogen-containing mixture. The hollow fibers typically have a diameter of the order of several hundredths of a millimeter to a few millimeters and wall thicknesses of the order of 1 $\mu$m to a few 100 $\mu$m. U.S. Pat. No. 4,175,153 specifically discloses a hydrogen separating stage with a cylindrical housing in which a bundle of such hollow fibers is placed in a mutually spaced manner. The hydrogen-containing mixture, such as the reaction end product of a water vapor reforming of methanol, is introduced into the housing on the face side and is guided through the interior of the hollow fibers arranged in parallel. The hydrogen is selectively diffused through the hollow fiber walls and, as the result, is separated from the remaining mixture constituents. U.S. Pat. No. 4,175,153 discloses, as a further application possibility, the use of such hydrogen-permeable hollow fibers as a fuel cell electrode in a fuel cell or in catalyst-filled hydrogen-generating reactors. A hydrogen generating reactor with several small thin hollow diffusion tubes which traverse a catalyst bed is disclosed in Austrian Patent Document AT 247 284.

One object of the present invention is to provide a reactor that can be constructed in a relatively compact and easy manner.

Another object of the invention is to provide a reactor that permits a high reaction efficiency.

Still another object of the invention is to provide such a reactor which, during a cold start, permits a fast heating of its membrane-type hollow fibers to an operating temperature suitable for the effective reaction constituent separation.

These and other objects and advantages are achieved by the reactor according to the invention, in which porous hollow fibers are placed directly in the reaction space and operate there as membranes for the selective separation of a selectively separable constituent contained in the reaction end product from the residual reaction end product. In this case, the constituent of the reaction end product formed in the reaction space which is to be separated, diffuses from the reaction space through the porous hollow fiber wall into the inner duct of the respective hollow fiber, and can be withdrawn from the reaction space by way of the hollow fiber ducts. The separating membranes are therefore situated directly at the site at which the catalytic chemical reaction takes place and permit a separation of the concerned constituent, such as hydrogen, from a hydrogen-containing mixture, with high selectivity and yield. By the separation of this constituent while at the site of the chemical reaction, the reaction equilibrium can be displaced to the side of the desired constituent.

The positioning of the membrane-type hollow fibers in the reaction space itself benefits a compact reactor construction, and by the use of membrane-type hollow fibers, in the case of a given constructional volume, a comparatively high membrane surface area can be made available for the diffusive separation of the desired constituent. The compact reactor construction with hollow-fiber separating membranes integrated in the reaction space has a favorable effect on achieving fast reaction times under fluctuating load conditions. This makes the reactor particularly suitable for motor vehicles, where transient operating phases occur frequently. In particular, the reactor can be used as a methanol reforming reactor for obtaining hydrogen by the water vapor reforming of methanol in fuel-cell-operated motor vehicles.

The porous hollow fibers are constructed of a ceramic or glass material and are provided with a selectivity-increasing metallic coating. The metal material of this coating is selected such that the selectivity of the separation of the desired reaction constituent is increased. Furthermore, devices are provided for heating the porous hollow fibers by applying an electric voltage to their metallic coating. This arrangement heats the hollow fibers in a simple manner, so that, for example, during a starting phase, they can very rapidly be brought to a raised temperature required for an effective separating function.

In the case of a reactor according to another embodiment of the present invention, the catalyst material is present in a catalyst layering which is formed by (1) a catalyst pellet charge; (2) a porous carrier body, into which the catalyst material is charged; or (3) a metallic foam catalyst body that consists of the mostly metallic catalyst material. The porous hollow fibers extend in a parallel arrangement with a predetermined mutual transverse spacing through the catalyst layering.

Other objects, advantages and novel features of the present invention will become apparent from the following detailed description of the invention when considered in conjunction with the accompanying drawings.

DETAILED DESCRIPTION OF THE DRAWINGS

Figure 1:
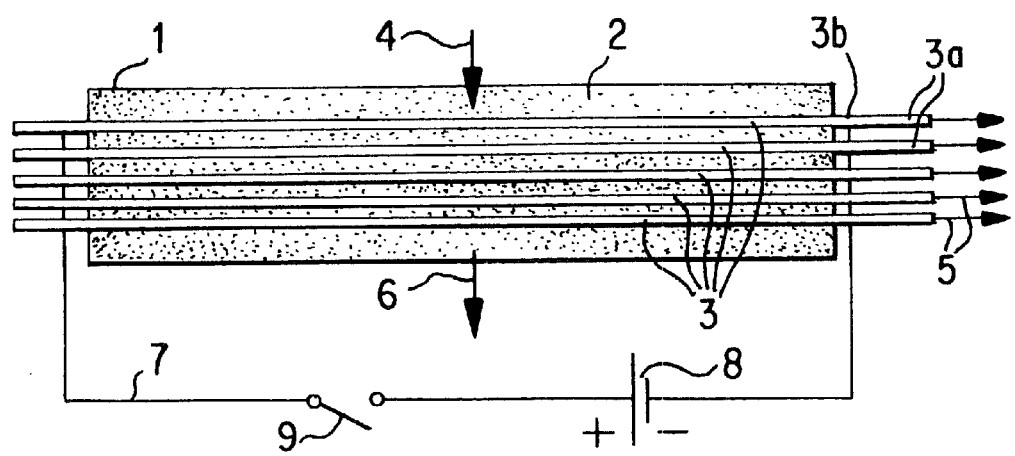
FIG. 1 is a schematic longitudinal sectional view of a reactor which can be used, for example, for the water vapor reforming of methanol.
Figure 2:
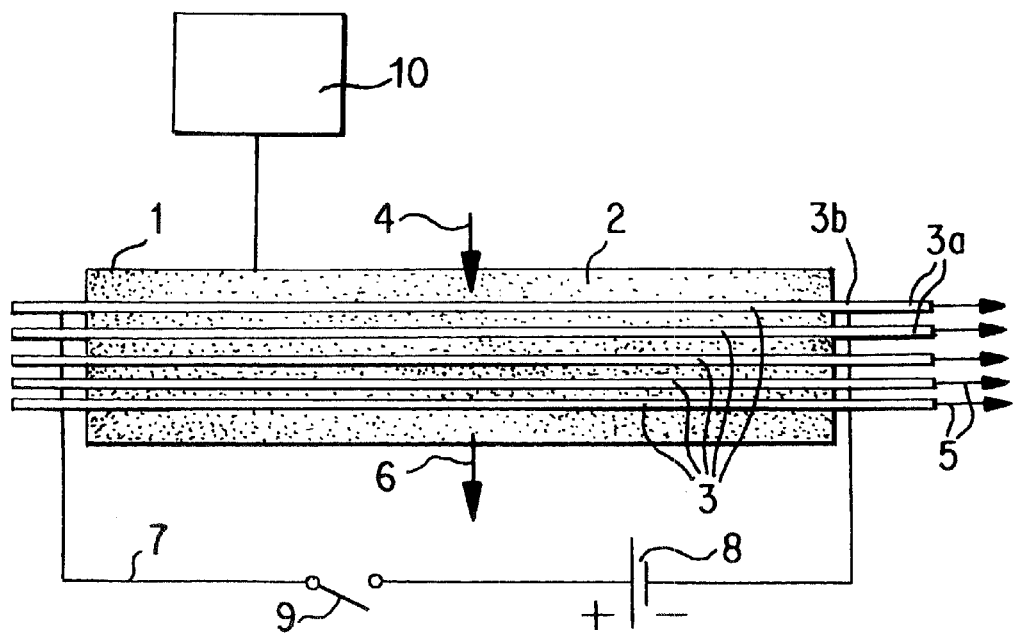
FIG. 2 is a schematic view of a reactor and heat source for the reaction space.

The reactor illustrated in the schematic longitudinal sectional view of the figure contains a reaction space 1 into whose interior a catalyst layering 2 is charged. The catalyst layering 2 contains a catalyst material suitable for carrying out the intended catalytic chemical reaction, for example, a $Cu/ZnO/Al_2O_3$-material for the case of a water vapor reforming of methanol. The catalyst layering 2 may be formed by (1) a catalyst pellet charge; (2) a porous, carrier body of a ceramic material, of glass, carbon or plastic, into whose pores the catalyst material is charged; or (3) a metallic foam body containing a metal which catalyzes the desired chemical reaction.

In a conventional manner, which is therefore not shown in detail, a gaseous or liquid reaction starting product 4 can be introduced into the reaction space 1 and can be converted there by a corresponding catalytic chemical reaction to a reaction end product that contains a gaseous or liquid constituent 5 which can be separated by means of membrane diffusion. In particular, the reactor can be used in a fuel-cell-operated motor vehicle for obtaining hydrogen for the fuel cells by means of a water vapor reforming of liquid methanol. The reaction starting product 4 is a prepared water vapor/methanol mixture. In this case, the reaction end product is a hydrogen-rich mixture which includes a certain part carbon monoxide and is therefore not suitable for direct feeding into the fuel cells.

Characteristically, hollow fibers 3 are placed in the reaction space 1 as membranes for the selective separation of a desired reaction constituent of the reaction end product formed by the reaction in the reaction space 1. Typical diameters of the hollow fibers 3 are in the range of between tens of micrometers to several millimeters and in the case of wall thicknesses in the range of from approximately 1 $\mu$m to several 100 $\mu$m. As a bundle and spaced in parallel from one another, the hollow fibers 3 extend through the reaction space 1 and penetrate the catalyst layering 2. They are of a construction and a composition which is known per se for this purpose and are selected as a function of the reaction constituent 5 which is to be selectively separated so that only this constituent, and not the other constituents of the reaction end product, can diffuse through the hollow-fiber wall in the inner duct 3a of the respective hollow fiber 3, from which it can be withdrawn from the reaction space.

In the above-mentioned technique for obtaining hydrogen by the water vapor reforming of methanol in fuel-cell-operated motor vehicles, the hollow fibers 3 are constructed to be correspondingly selectively hydrogen-permeable so that the hydrogen is separated from the residual constituents of the reaction end product in an extremely pure form and can be discharged by way of the interior ducts 3a of the hollow fibers 3 from the reaction space 1 and can be fed to the fuel cells. The residual reaction end product 6 is discharged in a conventional manner, which is not shown, from the reaction space 1. As schematically illustrated in the figure, the main flow direction of the reaction starting product 4 guided through the reaction space is selected to be perpendicular to the longitudinal direction of the hollow fibers 3.

If the carrying-out of an endothermal reaction is intended, as is the case during the water vapor reforming of methanol, the required heat is provided to the catalyst layering 2 in a conventional manner. Examples of heating the catalyst layer include external heating 10 of the reaction space or causing a preferably catalytic combustion operation in the reaction space 1, for example, with the additional feeding of oxygen, which permits an exothermal partial oxidation reaction.

In order to increase the separating selectivity of the hollow fibers 3 with respect to the reaction constituent to be separated, the hollow fibers 3 are provided with a metallic layer 3b, on the exterior side, or as an alternative on the interior side. Metals of the groups IVb, Vb and VIII as well as their alloys or fine-pored ceramics therefrom are suitable for this purpose.

In addition, the metallic coating 3b of the hollow fibers 3 can be utilized for a rapid heating of the porous hollow fibers 3. For this purpose, the metallic coatings 3b of the individual hollow fibers 3 are connected electrically in parallel to a heating circuit 7 which is shown only schematically and which contains a voltage source 8 and a controllable switching element 9 for switching the heater on and off. The hollow fibers 3 are in each case connected by means of their metallic layer 3b on the end side with a respective pole of the heating voltage source 8 so that, when the switch 9 is closed, a heating current flows through the metallic layers 3b and generates ohmic heat there. As a result, the hollow fibers can be heated during a starting phase within a few seconds, to a temperature which is above the ambient temperature, at which the diffusion of the constituent which is selectively separated, such as the hydrogen of a hydrogen-rich reformate gas mixture, takes place with sufficient effectiveness.

The control of the functions specifically mentioned above as well as of the other customary reactor functions is carried out by a suitable reactor control device which is not shown and which is designed correspondingly, which is obvious to a person skilled in the art.

It is also understood that, in addition to the illustrated example, further implementations of the reactor according to the invention are conceivable, in which case reactors according to the invention can be used not only, as described, for the water vapor reforming of methanol but for other catalytic chemical reactions in which a gaseous or liquid reaction starting product is reacted in a reaction space to a reaction end product which contains a gaseous or liquid reaction constituent which can be selectively separated by means of the porous membrane-type hollow fibers. In this case, arbitrary constructions of the reaction space are conceivable in which the hollow fibers are placed in a suitable number and arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor for the catalytic chemical reaction of a gaseous or liquid reaction starting product to a reaction end product that contains a gaseous or liquid reaction constituent which can be selectively separated by means of membrane diffusion, comprising:

a reaction space into which the reaction starting product flows;

a catalyst material disposed in the reaction space;

porous hollow fibers disposed in the reaction space, said porous hollow fibers being made of a material which is selectively permeable to said gaseous or liquid reaction constituent, for separation of the gaseous or liquid reaction constituent from the reaction end product by diffusion thereof through walls of said porous hollow fiber, from said reaction space into an interior space of said porous hollow fibers;

a metallic coating on each of the porous hollow fibers;

a device that heats the porous hollow fibers during a starting phase to an operating temperature at which selective diffusion of the reaction end product occurs by applying an electric voltage to the metallic coatings; and a separate heat source that heats the catalyst material in the reaction space.

2. A reactor according to claim 1, wherein the catalyst material in the reaction space comprises catalyst pellets.

3. A reactor according to claim 1, wherein said hollow fibers comprise a ceramic material or a glass material.

4. A reactor according to claim 1, wherein the catalyst material in the reaction space is a metallic foam body and said porous hollow fibers extend through said metallic foam body.

5. A reactor according to claim 4, wherein said hollow fibers extend through said metallic foam body in an equally spaced manner.

6. A reactor according to claim 1, wherein the catalyst material is in the pores of a carrier body made of a material selected from the group consisting of ceramic, glass, carbon and plastic.

7. A reactor according to claim 1, wherein said catalyst material comprises a compound comprising $Cu, ZnO, Al_2O_3$ and combinations thereof.

8. A reactor according to claim 1, wherein said metallic coatings comprise a metal, metal alloy or ceramic comprising an element selected from the group consisting of Group IVb, Group Vb and Group VIII of the periodic table of elements.

9. A reactor according to claim 1, wherein the separate heat source is an external heat source.

* * * * *